US00RE50064E

(19) United States
(12) Reissued Patent
Susukida et al.

(10) Patent Number: US RE50,064 E
(45) Date of Reissued Patent: Jul. 30, 2024

(54) LUBRICATING OIL COMPOSITION

(71) Applicants: ENEOS CORPORATION, Tokyo (JP); TOYOTA JIDOSHA KABUSHIKI KAISHA, Aichi-ken (JP)

(72) Inventors: Yohei Susukida, Tokyo (JP); Takahiro Fukumizu, Aichi-ken (JP); Takatoshi Shinyoshi, Aichi-ken (JP); Daisuke Tokozakura, Aichi-ken (JP)

(73) Assignees: TOYOTA JIDOSHA KABUSHIKI KAISHA, Aichi-Ken (JP); ENEOS CORPORATION, Tokyo (JP)

(21) Appl. No.: 17/852,731

(22) Filed: Jun. 29, 2022

Related U.S. Patent Documents

Reissue of:
(64) Patent No.: 11,214,755
Issued: Jan. 4, 2022
Appl. No.: 16/842,253
Filed: Apr. 7, 2020

(30) Foreign Application Priority Data

Apr. 10, 2019 (JP) ..... 2019-075037

(51) Int. Cl.

| | |
|---|---|
| ***C10M 135/36*** | (2006.01) |
| ***C10M 129/54*** | (2006.01) |
| ***C10M 133/44*** | (2006.01) |
| ***C10M 137/02*** | (2006.01) |
| ***C10M 141/10*** | (2006.01) |
| ***C10M 145/14*** | (2006.01) |
| ***C10M 161/00*** | (2006.01) |

(Continued)

(52) U.S. Cl.
CPC ..... *C10M 169/044* (2013.01); *C10M 129/54* (2013.01); *C10M 133/44* (2013.01); *C10M 135/36* (2013.01); *C10M 137/02* (2013.01); *C10M 141/10* (2013.01); *C10M 145/14* (2013.01); *C10M 161/00* (2013.01); *C10M 2203/003* (2013.01); *C10M 2207/144* (2013.01); *C10M 2209/084* (2013.01); *C10M 2215/30* (2013.01); *C10M 2219/106* (2013.01); *C10M 2223/049* (2013.01); *C10N 2020/04* (2013.01); *C10N 2030/02* (2013.01); *C10N 2030/04* (2013.01); *C10N 2040/04* (2013.01)

(58) Field of Classification Search
CPC ..... C10M 145/14; C10M 161/00; C10M 141/10; C10M 169/04; C10M 133/44; C10M 129/54; C10M 169/044; C10M 137/02; C10M 135/36; C10M 2209/084; C10M 2203/003; C10M 2223/049; C10M 2207/144; C10M 2219/106; C10M 2215/30; C10M 2215/28; C10M 2203/1025; C10M 2215/223; C10M 2207/262; C10M 2205/0285; C10N 2030/04; C10N 2040/04; C10N 2030/12; C10N 2010/04; C10N 2020/02; C10N 2030/06; C10N 2030/02; C10N 2020/04; C10N 2060/14
See application file for complete search history.

(56) References Cited

U.S. PATENT DOCUMENTS

2004/0209786 A1 10/2004 Sagawa et al.
2011/0166053 A1 7/2011 Yamada
(Continued)

FOREIGN PATENT DOCUMENTS

CN 107 541 317 A 1/2018
CN 109 477 027 3/2019
(Continued)

*Primary Examiner* — Ling X Xu
(74) *Attorney, Agent, or Firm* — GREENBLUM & BERNSTEIN, P.L.C.

(57) ABSTRACT

A lubricating oil composition including: a lubricating base oil; (A) a poly(meth)acrylate having a weight average molecular weight of no more than 50,000, in an amount of 2 to 10 mass %; (B) a phosphite ester of the general formula (1) in an amount of 0.01 to 0.06 mass % in terms of P; (C) a thiadiazole compound in an amount of 0.01 to 0.2 mass %; and (D) a Ca salicylate detergent in an amount of 0.005 to 0.03 mass % in terms of Ca, wherein the lubricating oil composition has a kinematic viscosity at 40° C. of 4.0 to 20.0 $mm^2/s$, and a kinematic viscosity at 100° C. of 1.8 to 5.2 $mm^2/s$; and has a ratio [S]/[P] of 2.2 to 4.0, wherein the [S] represents a sulfur content, and the [P] represents a phosphorus content:

(1)

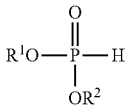

wherein $R^1$ and $R^2$ are each independently a group having 5 to 20 carbons represented by the general formula (2); and (2)

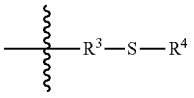

wherein $R^3$ is a C2-17 linear chain hydrocarbon group, and $R^4$ is a C2-17 linear chain hydrocarbon group.

10 Claims, No Drawings

(51) Int. Cl.

| | |
|---|---|
| ***C10M 169/04*** | (2006.01) |
| ***C10N 20/04*** | (2006.01) |
| ***C10N 30/02*** | (2006.01) |
| ***C10N 30/04*** | (2006.01) |
| ***C10N 40/04*** | (2006.01) |

(56) References Cited

U.S. PATENT DOCUMENTS

| | | | | |
|---|---|---|---|---|
| 2014/0187457 | A1* | 7/2014 | Kanga | C10M 149/04 508/464 |
| 2015/0018256 | A1* | 1/2015 | Komatsubara | C10M 141/10 508/272 |
| 2015/0057202 | A1 | 2/2015 | Nakao et al. | |
| 2017/0145337 | A1* | 5/2017 | Masuda | C10M 135/20 |
| 2017/0369808 | A1 | 12/2017 | Kusuhara | |
| 2018/0087002 | A1 | 3/2018 | Komatsubara et al. | |
| 2019/0316058 | A1 | 10/2019 | Yanagihara et al. | |
| 2020/0032160 | A1 | 1/2020 | Komatsubara et al. | |

FOREIGN PATENT DOCUMENTS

| | | | |
|---|---|---|---|
| DE | 112015002841 | T5 | 3/2017 |
| JP | 2006-117851 | | 5/2006 |
| JP | 2006-117851 | A | 5/2006 |
| JP | 2008-285682 | | 11/2008 |
| JP | 2008-285682 | A | 11/2008 |
| JP | 2016-216683 | | 12/2016 |
| JP | 2016-216683 | A | 12/2016 |
| JP | 2018-53017 | | 4/2018 |
| JP | 2018-053017 | A | 4/2018 |
| JP | 2018-70700 | | 5/2018 |
| JP | 2018-070700 | A | 5/2018 |
| WO | 2004/069967 | | 8/2004 |
| WO | 2004/069967 | A1 | 8/2004 |
| WO | 2010/032781 | | 3/2010 |
| WO | 2010/032781 | A1 | 3/2010 |
| WO | 2013/136582 | | 9/2013 |
| WO | 2013/136582 | A1 | 9/2013 |
| WO | 2016/136873 | | 9/2016 |
| WO | 2016/136873 | A1 | 9/2016 |
| WO | 2018/190431 | | 10/2018 |
| WO | 2018/190431 | A1 | 10/2018 |

* cited by examiner

LUBRICATING OIL COMPOSITION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The present invention relates to a lubricating oil composition, and specifically to a lubricating oil composition suitable for lubrication of electric motors.

BACKGROUND

In recent years, electric vehicles which use an electric motor as a power source for running, and hybrid vehicles which use an electric motor and an internal combustion engine together as a power source for running, are attracting interest in view of energy efficiency and environmental compatibility. While electric motors generate heat during operation thereof, electric motors include a heat-sensitive component such as a coil and a magnet. Those vehicles which run using an electric motor as a power source for running are thus provided with means for cooling the electric motor. Known means for cooling the electric motor include air cooling, water cooling, and oil cooling. Among them, oil cooling is to circulate oil in the electric motor, to directly make a part in the electric motor which generates heat (such as a coil, a core, and a magnet) contact with a coolant (oil), which makes it possible to obtain a high cooling effect. In the electric motor using oil cooling, oil (lubricating oil) is circulated in the electric motor, to cool and lubricate the electric motor at the same time. Electrical insulation is required of a lubricating oil (electric motor oil) of the electric motor.

Vehicles which use an electric motor as a power source for running usually include a transmission having a gear mechanism. Various additives are incorporated into a lubricating oil to lubricate the gear mechanism since anti-seizure performance and anti-fatigue performance are required of the lubricating oil.

CITATION LIST

Patent Literature

[Patent Literature 1] WO 2018/190431
[Patent Literature 2] WO 2016/136873
[Patent Literature 3] JP 2018-070700 A
[Patent Literature 4] JP 2018-053017 A
[Patent Literature 5] WO 2004/069967
[Patent Literature 6] WO 2013/136582
[Patent Literature 7] JP 2006-117851 A
[Patent Literature 8] WO 2010/032781

SUMMARY

Technical Problem

A lubricating oil used for lubricating electric motors is usually different from that used for lubricating transmissions. If electric motors and transmissions (gear mechanisms) can be lubricated using the same lubricating oil, lubricating oil circulation systems can be simplified. Recently, an electric drive module into which an electric motor and a transmission (gear mechanism) are integrated as one device (package) has been also proposed. For lubrication of such an electric drive module, it is desirable to lubricate an electric motor and a transmission (gear mechanism) using the same lubricating oil in view of downsizing and weight reduction.

Disadvantageously, conventional transmission oils suffer insufficient electrical insulation when they are oxidatively deteriorated by the use thereof, even if electrical insulation of fresh oils thereof is improved for a use for lubrication of electric motors. Anti-seizure performance and anti-fatigue performance of conventional electric motor oils are not enough for a use for lubrication of transmissions (gear mechanisms).

Not only electrical insulation but also copper corrosion inhibition performance, which is used as a material of electric motors, is required of electric motor oils.

An object of the present invention is to provide a lubricating oil composition having electrical insulation of the oxidatively deteriorated composition, anti-seizure performance, copper corrosion inhibition performance, and anti-fatigue performance in a well-balanced manner.

Solution to Problem

A first aspect of the present invention is a lubricating oil composition comprising: a lubricating base oil comprising at least one mineral base oil, at least one synthetic base oil, or any mixture thereof, and having a kinematic viscosity at 40° C. of 5.0 to 15.0 $mm^2/s$ and a kinematic viscosity at 100° C. of 1.7 to 3.5 $mm^2/s$; (A) a poly(meth)acrylate viscosity index improver having a weight average molecular weight of no more than 50,000, in an amount of 2 to 10 mass % on the basis of the total mass of the composition; (B) a phosphite ester compound represented by the following general formula (1), in an amount of 0.01 to 0.06 mass % in terms of phosphorus on the basis of the total mass of the composition; (C) a thiadiazole compound in an amount of 0.01 to 0.2 mass % on the basis of the total mass of the composition; and (D) a calcium salicylate detergent in an amount of 0.005 to 0.03 mass % in terms of calcium on the basis of the total mass of the composition, wherein the lubricating oil composition has a kinematic viscosity at 40° C. of 4.0 to 20.0 $mm^2/s$, and a kinematic viscosity at 100° C. of 1.8 to 5.2 $mm^2/s$; and the lubricating oil composition has a ratio [S]/[P] of 2.2 to 4.0, wherein the [S] represents a sulfur content (unit: mass %) in the lubricating oil composition, and the [P] represents a phosphorus content (unit: mass %) in the lubricating oil composition:

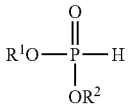

(1)

wherein in the general formula (1), $R^1$ and $R^2$ are each independently a group having 5 to 20 carbons represented by the following general formula (2); and

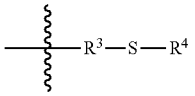

(2)

wherein in the general formula (2), $R^3$ is a C2-17 linear chain hydrocarbon group, and $R^4$ is a C2-17 linear chain hydrocarbon group.

In the present specification, "phosphorous acid" means $H_3PO_3$, which is an oxoacid of phosphorus having an oxidation number of +III. While the phosphite ester compound represented by the general formula (1) usually has tautomerism, any tautomers of the compound represented by the general formula (1) shall fall under the component (B) in the present specification.

A second aspect of the present invention is a method for lubricating an electric motor, or the electric motor and a transmission, of an automobile comprising the electric motor, the method comprising: lubricating the electric motor, or the electric motor and the transmission by means of the lubricating oil composition according to the first aspect of the present invention.

Advantageous Effects

The first aspect of the present invention can provide a lubricating oil composition having electrical insulation of the oxidatively deteriorated composition, anti-seizure performance, copper corrosion inhibition performance, and anti-fatigue performance.

The lubricating oil composition according to the first aspect of the present invention may be preferably used in the lubricating method according to the second aspect of the present invention.

DESCRIPTION OF EMBODIMENTS

The present invention will be described hereinafter. In the present specification, expression "A to B" concerning numeral values A and B means "no less than A and no more than B" unless otherwise specified. In such expression, if a unit is added only to the numeral value B, the unit is applied to the numeral value A as well. Also, a word "or" means a logical sum unless otherwise specified. In the present specification, expression "$E_1$ and/or $E_2$" concerning elements $E_1$ and $E_2$ means "$E_1$, or $E_2$, or the combination thereof", and expression "$E_1, \ldots, E_{N-1}$, and/or $E_N$" concerning elements $E_1, \ldots, E_N$ (N is an integer of 3 or more) means "$E_1, \ldots, E_{N-1}$, or $E_N$, or any combination thereof".

In the present specification, the content of each element of calcium, magnesium, zinc, phosphorus, sulfur, boron, barium, and molybdenum in an oil shall be measured by inductively coupled plasma optical emission spectrometry (intensity ratio method), conforming to JPI-5S-38-2003; and the content of nitrogen elements in an oil shall be measured by a chemiluminescence method, conforming to JIS K2609.

<Lubricating Base Oil>

At least one mineral base oil, at least one synthetic base oil, or any mixed base oil thereof may be used as a lubricating base oil in a lubricating oil composition of the present invention (hereinafter may be referred to as "lubricating oil composition" or simply "composition"). In one embodiment, a Group II base oil of API base stock categories (hereinafter may be referred to as "API Group II base oil" or simply "Group II base oil"), a Group III base oil of API base stock categories (hereinafter may be referred to as "API Group III base oil" or simply "Group III base oil"), a Group IV base oil of API base stock categories (hereinafter may be referred to as "API Group IV base oil" or simply "Group IV base oil"), or a Group V base oil of API base stock categories (hereinafter may be referred to as "API Group V base oil" or simply "Group V base oil"), or a mixed base oil thereof may be preferably used, and a Group II base oil, a Group III base oil, or a Group IV base oil, or a mixed base oil thereof may be more preferably used. API Group II base oils are mineral base oils containing no more than 0.03 mass % sulfur and no less than 90 mass % saturates, and having a viscosity index of no less than 80 and less than 120. API Group III base oils are mineral base oils containing no more than 0.03 mass % sulfur and no less than 90 mass % saturates, and having a viscosity index of no less than 120. API Group IV base oils are poly-α-olefin base oils. API Group V base oils are base oils other than the foregoing Groups I to IV base oils, and preferably ester base oils.

The mineral base oil may be, for example, a paraffinic or naphthenic mineral base oil obtained through application of one or at least two of refining means in suitable combination, such as solvent deasphalting, solvent extraction, hydrocracking, solvent dewaxing, catalytic dewaxing, hydrorefining, sulfuric acid washing, and white clay treatment, to lubricant oil fractions that are obtained by distillation of crude oil under atmospheric pressure and under reduced pressure. API Group II base oils and Group III base oils are usually produced via hydrocracking. A wax isomerized base oil, a base oil produced by a process of isomerizing GTL WAX (gas to liquid wax), or the like may be also used.

Examples of the API Group IV base oil include ethylene-propylene copolymers, polybutene, 1-octene oligomers, and 1-decene oligomers, and hydrogenated products thereof.

Examples of the API Group V base oil include monoesters (such as butyl stearate, octyl laurate, and 2-ethylhexyl oleate); diesters (such as ditridecyl glutarate, bis(2-ethylhexyl) adipate, diisodecyl adipate, ditridecyl adipate, and bis(2-ethylhexyl) sebacate); polyesters (such as trimellitate esters); and polyol esters (such as trimethylolpropane caprylate, trimethylolpropane pelargonate, pentaerythritol 2-ethylhexanoate, and pentaerythritol pelargonate).

The lubricating base oil may comprise one base oil, and may be a mixed base oil comprising at least two base oils. In the mixed base oil comprising at least two base oils, the API base stock categories of these base oils may be the same, and may be different from each other. The content of the API Group V base oil is preferably 0 to 20 mass %, more preferably 0 to 15 mass %, further preferably 0 to 10 mass %, and especially preferably substantially 0 mass %, on the basis of the total mass of the lubricating base oil. The content of an ester base oil at the above described upper limit or less can offer improved oxidation stability of the lubricating oil composition.

The kinematic viscosity of the lubricating base oil (total base oil) at 100° C. is 1.7 to 3.5 $mm^2/s$, and preferably 2.2 to 3.0 $mm^2/s$. The kinematic viscosity of the lubricating base oil at 100° C. at the above described upper limit or less can lead to improved fuel efficiency. The kinematic viscosity of the lubricating base oil at 100° C. at the above described lower limit or more can lead to improved electrical insulation of a fresh oil, and improved anti-seizure performance and anti-fatigue performance. In the present specification, "kinematic viscosity at 100° C." means the kinematic viscosity at 100° C. specified in ASTM D-445.

The kinematic viscosity of the lubricating base oil (total base oil) at 40° C. is 5.0 to 15.0 $mm^2/s$, and preferably 7.0 to 12.0 $mm^2/s$. The kinematic viscosity of the lubricating base oil at 40° C. at the above described upper limit or less can lead to improved fuel efficiency. The kinematic viscosity of the lubricating base oil at 40° C. at the above described lower limit or more can lead to improved electrical insulation of a fresh oil, and improved anti-seizure performance and anti-fatigue performance. In the present specification, "kinematic viscosity at 40° C." means the kinematic viscosity at 40° C. specified in ASTM D-445.

The viscosity index of the lubricating base oil (total base oil) is preferably no less than 100, and more preferably no less than 105; and in one embodiment, may be no less than 110, may be no less than 120, and may be no less than 125. The viscosity index of the lubricating base oil at the above described lower limit or more can lead to improved viscosity-temperature characteristics, thermal and oxidation stability, and anti-wear performance of the lubricating oil composition, and a reduced friction coefficient. In the present specification, a viscosity index means a viscosity index measured conforming to JIS K 2283-1993.

The sulfur content in the lubricating base oil (total base oil) is, in view of oxidation stability, preferably no more than 0.03 mass % (300 mass ppm), more preferably no more than 50 mass ppm, and especially preferably no more than 10 mass ppm, and may be no more than 1 mass ppm.

The content of the lubricating base oil (total base oil) in the lubricating oil composition is preferably 50 to 95 mass %, and more preferably 70 to 95 mass %, on the basis of the total mass of the composition.

<(A) Poly(meth)acrylate Viscosity Index Improver>

The lubricating oil composition of the present invention comprises (A) a poly(meth)acrylate viscosity index improver having a weight average molecular weight of no more than 50,000 (hereinafter may be referred to as "component (A)"). As the component (A), one poly(meth)acrylate compound may be used alone, and at least two poly(meth) acrylate compounds may be used in combination. In the present specification, "(meth)acrylate" means "acrylate and/or methacrylate".

As the component (A), any poly(meth)acrylate viscosity index improver that is used in lubricating oils, and has a weight average molecular weight of no more than 50,000 may be used without particular limitations. As the component (A), any of a non-dispersant poly(meth)acrylate and a dispersant poly(meth)acrylate may be used, and the combination thereof may be used. Among them, a non-dispersant poly(meth)acrylate viscosity index improver is preferably used. In the present specification, "dispersant poly(meth) acrylate" means a poly(meth)acrylate compound having a functional group including a nitrogen atom, and "non-dispersant poly(meth)acrylate" means a poly(meth)acrylate compound not having a functional group including a nitrogen atom. The use of a non-dispersant poly(meth)acrylate viscosity index improver as the component (A) can lead to further improved anti-seizure performance.

The weight average molecular weight of the component (A) is no more than 50,000, preferably 10,000 to 50,000, and more preferably 20,000 to 50,000. The weight average molecular weight of the component (A) at the above described upper limit or less can lead to improved anti-seizure performance. The weight average molecular weight of the component (A) at the above described lower limit or more can lead to improved electrical insulation of a fresh oil, and further improved anti-fatigue performance. In the present specification, "weight average molecular weight" means a weight average molecular weight measured by gel permeation chromatography (GPC) in terms of standard polystyrene.

The content of the component (A) in the lubricating oil composition is 2 to 10 mass %, preferably 3 to 10 mass %, and more preferably 5 to 10 mass %, on the basis of the total mass of the composition. The content of the component (A) at the above described lower limit or more can lead to improved anti-seizure performance and improved electrical insulation of the oxidatively deteriorated composition. The content of the component (A) at the above described upper limit or less can lead to improved fuel efficiency.

<(B) Phosphite ester Compound>

The lubricating oil composition of the present invention comprises a phosphite ester compound (hereinafter may be referred to as "component (B)") represented by the general formula (1). As the component (B), one phosphite ester compound may be used alone, and at least two phosphite ester compounds may be used in combination.

(1)

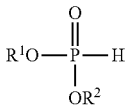

wherein in the general formula (1), $R^1$ and $R^2$ are each independently a group having 5 to 20 carbons represented by the following general formula (2).

In the present specification, "phosphorous acid" means $H_3PO_3$, which is an oxoacid of phosphorus having an oxidation number of +III. While the phosphite ester compound represented by the general formula (1) usually has tautomerism, any tautomers of the compound represented by the general formula (1) shall fall under the component (B) in the present specification.

(2)

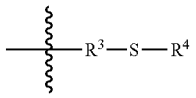

wherein in the general formula (2), $R^3$ is a C2-17 linear chain hydrocarbon group, preferably an ethylene group or a propylene group, and in one embodiment, an ethylene group; $R^4$ is a C2-17 linear chain hydrocarbon group, preferably a C2-16 linear chain hydrocarbon group, and more preferably a C2-10 linear chain hydrocarbon group.

The use of the phosphite ester compound having the foregoing structure as the component (B) can lead to improved anti-seizure performance and anti-fatigue performance.

Preferred examples of $R^1$ and $R^2$ include 3-thiapentyl group, 3-thiahexyl group, 3-thiaheptyl group, 3-thiaoctyl group, 3-thianonyl group, 3-thiadecyl group, 3-thiaundecyl group, and 4-thiahexyl group.

The content of the component (B) in the lubricating oil composition is 0.01 to 0.06 mass %, preferably 0.02 to 0.05 mass %, and more preferably 0.02 to 0.04 mass %, in terms of phosphorus on the basis of the total mass of the lubricating oil composition. The content of the component (B) at the above described upper limit or less can lead to improved electrical insulation of a fresh oil, improved electrical insulation of the oxidatively deteriorated composition, and improved anti-seizure performance. The content of the component (B) at the above described lower limit or more can lead to improved anti-seizure performance and anti-fatigue performance.

<(C) Thiadiazole Compound>

The lubricating oil composition of the present invention further comprises (C) a thiadiazole compound (hereinafter may be referred to as "component (C)"). As the component (C), one thiadiazole compound may be used alone, and at least two thiadiazole compounds may be used in combination.

Examples of the component (C) include 1,3,4-thiadiazole represented by the following general formula (3), 1,2,4-thiadiazole compound represented by the following general formula (4), and 1,2,3-thiadiazole compound represented by the following general formula (5).

(3)

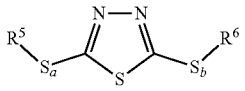

(4)

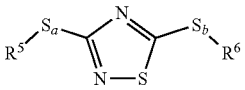

(5)

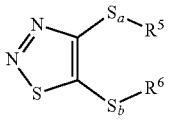

(in the general formulae (3) to (5), $R^5$ and $R^6$ may be the same or different, and each independently represent a hydrogen atom or a C1-20 hydrocarbyl group; and a and b may be the same or different, and each independently represent integers of 0 to 8.)

Among the foregoing thiadiazole compounds, a thiadiazole compound represented by any of the above general formulae (3) to (5), and having a hydrocarbyldithio group may be especially preferably used.

The content of the component (C) in the lubricating oil composition is 0.01 to 0.2 mass % on the basis of the total mass of the lubricating oil composition. The content of the component (C) at the above described lower limit or more can lead to improved copper corrosion inhibition performance. The content of the component (C) at the above described upper limit or less can lead to improved electrical insulation of a fresh oil, and improved electrical insulation of the oxidatively deteriorated composition.

<(D) Calcium Salicylate Detergent>

The lubricating oil composition of the present invention comprises (D) a calcium salicylate detergent (hereinafter may be simply referred to as "component (D)"). As the component (D), a calcium salicylate, or a basic salt or overbased salt thereof may be used. As the component (D), one calcium salicylate detergent may be used alone, and at least two calcium salicylate detergents may be used in combination. Examples of the calcium salicylate include a compound represented by the following general formula (6).

(6)

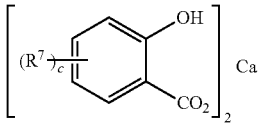

In the general formula (6), $R^7$ each independently represent a C14-30 alkyl or alkenyl group, and c represents 1 or 2, and is preferably 1. The component (D) may be a mixture of a compound where c=1 and a compound where c=2. When c=2, $R^7$ may be any combination of different groups.

One preferred embodiment of the calcium salicylate detergent may be a calcium salicylate represented by the above general formula (6) where c=1, or a basic salt or overbased salt thereof.

A method of producing the calcium salicylate is not particularly restricted, and a known method of producing monoalkylsalicylates or the like may be used. For example, the calcium salicylate may be obtained by: making a metal base such as oxides and hydroxides of calcium react with a monoalkylsalicylic acid obtained by alkylating a phenol as a starting material with an olefin, and then carboxylating the resultant product with carbonic acid gas or the like, or with a monoalkylsalicylic acid obtained by alkylating a salicylic acid as a starting material with an equivalent of the olefin, or the like; converting the above monoalkylsalicylic acid or the like to an alkali metal salt such as a sodium salt and a potassium salt, and then performing transmetallation with a calcium salt; or the like.

The method of obtaining the overbased calcium salicylate is not particularly restricted. For example, a calcium salicylate is made to react with a calcium base such as calcium hydroxide in the presence of carbonic acid gas, which makes it possible to obtain the overbased calcium salicylate.

The base number of the component (D) is not particularly limited, but is preferably 50 to 350 mgKOH/g, more preferably 100 to 350 mgKOH/g, and especially preferably 150 to 350 mgKOH/g. The base number of the component (D) at the above described lower limit or more can lead to further improved electrical insulation of the oxidatively deteriorated composition. In the present specification, a base number means a base number measured by the perchloric acid method, conforming to JIS K2501. Generally, metallic detergents are obtained by reaction in a diluent such as a solvent and a lubricating base oil. Therefore, metallic detergents are on the market as diluted in a diluent such as a lubricating base oil. In present specification, the base number of a metallic detergent shall mean a base number as a diluent is contained.

The content of the component (D) in the lubricating oil composition is 0.005 to 0.03 mass %, and preferably 0.005 to 0.02 mass %, in terms of calcium on the basis of the total mass of the lubricating oil composition. The content of the component (D) at the above described upper limit or less can lead to improved electrical insulation of a fresh oil, and improved electrical insulation of the oxidatively deteriorated composition. The content of the component (D) at the above described lower limit or more can lead to improved anti-fatigue performance.

The lubricating oil composition may comprise the calcium salicylate detergent only, and may further comprise at least one metallic detergent other than the calcium salicylate detergent (such as a calcium sulfonate detergent and a calcium phenate detergent), as a metallic detergent. The total content of the metallic detergent in the lubricating oil composition is preferably 0.005 to 0.03 mass % in terms of metal. The total content of the metallic detergent in the lubricating oil composition at the above described upper limit or less can lead to improved electrical insulation of a fresh oil, and further improved electrical insulation of the oxidatively deteriorated composition. The proportion of salicylates to the total soap group of the metallic detergent, that is, the proportion of mass of the total soap group of the salicylate detergent in terms of organic acid to mass of the total soap group of the metallic detergent in terms of organic acid is preferably 65 to 100 mass %, and more preferably 90 to 100 mass %. Contribution of salicylates to the total content of the metallic detergent at the above described lower limit or more can lead to further improved anti-fatigue performance. In the present specification, a soap group of the metallic detergent means a conjugate base of an organic acid which constitutes the soap content of the metallic detergent (examples thereof in the salicylate detergent include alkylsalicylate anions, examples thereof in the sulfonate detergent include alkylbenzenesulfonate anions, and examples thereof in the phenate detergent include alkylphenate anions). Generally, in the field of lubricating oils, an organic acid metal base that can form a micelle in a base oil (such as alkali or alkaline earth metal alkylsalicylates, alkali or alkaline earth metal alkylbenzene sulfonates, and alkali or alkaline earth metal alkylphenates), or a mixture of such an organic acid metal base and a basic metal salt (such as hydroxides, carbonates and borates of an alkali or alkaline earth metal which constitutes such an organic acid metal base) is used as a metallic detergent. Such an organic acid usually has at least one polar group having Broensted acidity (such as a carboxy group, a sulfo group, and a phenolic hydroxy group) such that it can form a salt with a metal base, and at least one lipophilic group such as linear or branched chain alkyl groups (examples thereof include linear or branched chain alkyl groups having 6 or more carbons), in its molecule.

<(E) Benzotriazol/tolyltriazole Metal Deactivator>

In one preferred embodiment, the lubricating oil composition may further comprise a tolyltriazole metal deactivator and/or a benzotriazol metal deactivator (hereinafter may be referred to as "component (E)"). As the component (E), any tolyltriazole metal deactivator and/or benzotriazol metal deactivator used in lubricating oils may be used without any particular limitation. As the component (E), one compound may be used alone, and at least two compounds may be used in combination.

The lubricating oil composition does not necessarily comprise the component (E). When the lubricating oil composition comprises the component (E), the content thereof is preferably 0.001 to 0.1 mass %, more preferably 0.001 to 0.075 mass %, and especially preferably 0.001 to 0.05 mass %. The content of the component (E) at the above described lower limit or more can lead to further improved copper corrosion inhibition performance. The content of the component (E) at the above described upper limit or less can lead to improved electrical insulation of a fresh oil and improved anti-wear performance, and further improved anti-seizure performance and further improved electrical insulation of the oxidatively deteriorated composition.

<(F) Succinimide Ashless Dispersant>

In one preferred embodiment, the lubricating oil composition may further comprise (F) a succinimide ashless dispersant (hereinafter may be referred to as "component (F)"). The component (F) may comprise a boronated succinimide ashless dispersant, may comprise a non-boronated succinimide ashless dispersant, and may comprise the combination thereof. In view of oxidation stability, the component (F) preferably comprises a boronated succinimide ashless dispersant.

As the component (F), for example, succinimide having at least one alkyl or alkenyl group in its molecule, or any derivative thereof may be used. Examples of succinimide having at least one alkyl or alkenyl group in its molecule include a compound represented by the following general formula (7) or (8).

(7)

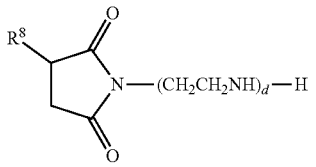

(8)

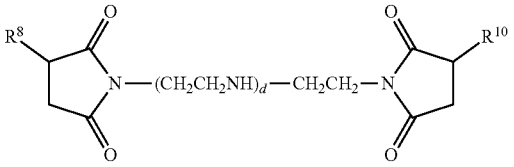

In the general formula (7), $R^8$ represents a C40-400 alkyl or alkenyl group, and d is an integer of 1 to 5, preferably 2 to 4. The carbon number of $R^8$ is preferably 60 to 350.

In the general formula (8), $R^9$ and $R^{10}$ each independently represent a C40-400 alkyl or alkenyl group, and may be any combination of different groups; and e is an integer of 0 to 4, preferably 1 to 4, and more preferably 1 to 3. The carbon numbers of $R^9$ and $R^{10}$ are preferably 60 to 350.

The carbon numbers of $R^8$ to $R^{10}$ in the general formulae (7) and (8) at the above described lower limits or more make it possible to obtain good solubility in the lubricating base oil. In contrast, the carbon numbers of $R^8$ to $R^{10}$ at the above described upper limits or less can lead to improved low-temperature fluidity of the lubricating oil composition.

The alkyl or alkenyl groups ($R^6$ to $R^{10}$) in the general formulae (7) and (8) may be linear or branched. Preferred examples thereof include branched alkyl groups and branched alkenyl groups derived from oligomers of olefins such as propene, 1-butene, and isobutene, or from co-oligomers of ethylene and propylene. Among them, a branched alkyl or alkenyl group derived from oligomers of isobutene that are conventionally referred to as polyisobutylene, or a polybutenyl group is most preferable.

Preferred number average molecular weights of the alkyl or alkenyl groups ($R^8$ to $R^{10}$) in the general formulae (7) and (8) are 800 to 3500, and preferably 1000 to 3500.

Succinimide having at least one alkyl or alkenyl group in its molecule includes so-called monotype succinimide represented by the general formula (7) wherein addition of succinic anhydride has occurred at only one end of a polyamine chain, and so-called bistype succinimide represented by the general formula (8) wherein addition of succinic anhydrides has occurred at both ends of a polyamine chain. The lubricating oil composition may comprise either monotype or bistype succinimide, and may include both of them as a mixture. The content of bistype succinimide or derivatives thereof in the component (F) is preferably no less than 50 mass %, and more preferably no less than 70 mass %, on the basis of the total mass of the component (F) (100 mass %).

The method for producing succinimide having at least one alkyl or alkenyl group in its molecule is not specifically limited. For example, such succinimide can be obtained as a condensation reaction product by: reaction of alkyl or alkenyl succinic acid having a C40-400 alkyl or alkenyl group, or an anhydride thereof, with a polyamine. As the component (F), such a condensation product may be used as it is, and may be converted into a derivative described later to be used. A condensation product of alkyl or alkenyl succinic acid, or an anhydride thereof, and a polyamine may be bistype succinimide where both terminals of a polyamine chain are imidated (see the general formula (8)), may be monotype succinimide where only one end of a polyamine chain is imidated (see the general formula (7)), and may be a mixture thereof. Here, an alkenyl succinic acid anhydride having a C40-400 alkenyl group may be obtained by, for example, reaction of a C40-400 olefin and maleic anhydride at 100 to 200° C. This alkenyl succinic acid anhydride may be further subjected to hydrogenation reaction, which makes it possible to obtain an alkyl succinic acid anhydride having a C40-400 alkyl group. Examples of a polyamine include diethylenetriamine, triethylenetetramine, tetraethylenepentamine, and pentaethylenehexamine, and any mixtures thereof. A polyamine raw material comprising at least one selected from them may be preferably used. The polyamine raw material may further or optionally comprise ethylenediamine. In view of improvement of the performance of the condensation product or derivative thereof as a dispersant, the content of ethylenediamine in the polyamine raw material is preferably 0 to 10 mass %, and more preferably 0 to 5 mass %, on the basis of the total mass of a polyamine. Succinimide obtained as a condensation reaction product of alkyl or alkenyl succinic acid having a C40-400 alkyl or alkenyl group, or anhydrides thereof, and a mixture of at least two polyamines, is a mixture of compounds of the general formulae (7) or (8) different in values of d or e.

As a derivative of succinimide, a boron-modified compound (boronated succinimide) in which a part or all of the residual amino groups and/or imino groups is/are neutralized or amidated by making boric acid react with the above described succinimide may be preferably used.

The weight average molecular weight of the component (F) is 1000 to 20000, more preferably 2000 to 20000, further preferably 3000 to 15000, and especially preferably 4000 to 9000. The weight average molecular weight of the component (F) at the above described lower limit or more can lead to improved electrical insulation of a fresh oil, and further improved electrical insulation of the oxidatively deteriorated composition. The weight average molecular weight of the component (F) at the above described upper limit or less can lead to further improved electrical insulation of the oxidatively deteriorated composition.

The lubricating oil composition does not necessarily comprise the component (F). When the lubricating oil composition comprises the component (F), the content thereof is preferably no more than 0.1 mass %, more preferably 0.01 to 0.08 mass %, and further preferably 0.03 to 0.08 mass %, in terms of nitrogen on the basis of the total mass of the lubricating oil composition. The content of the component (F) at the above described lower limit or more can lead to improved electrical insulation of a fresh oil. The content of the component (F) at the above described upper limit or less can lead to improved electrical insulation of a fresh oil, and further improved electrical insulation of the oxidatively deteriorated composition.

<(G) Antioxidant>

In one preferred embodiment, the lubricating oil composition may further comprise (G) an antioxidant (hereinafter may be referred to as "component (G)"). As the component (G), one compound may be used alone, and at least two compounds may be used in combination. As the component (G), any known antioxidant such as an amine antioxidant and a phenolic antioxidant may be used without particular limitation.

Examples of an amine antioxidant include aromatic amine antioxidants and hindered amine antioxidants. Examples of aromatic amine antioxidants include primary aromatic amine compounds such as alkylated-α-naphthylamine; and secondary aromatic amine compounds such as alkylated diphenylamine, phenyl-α-naphthylamine, alkylated phenyl-60 -naphthylamine, and phenyl-β-naphthylamine. As an aromatic amine antioxidant, alkylated diphenylamine, or alkylated phenyl-α-naphthylamine, or the combination thereof may be preferably used.

Examples of hindered amine antioxidants include 2,2,6,6-tetraalkylpiperidine derivatives. As a 2,2,6,6-tetraalkylpiperidine derivative, a 2,2,6,6-tetraalkylpiperidine derivative having a substituent in 4-position is preferable. Two 2,2,6,6-tetraalkylpiperidine skeletons may be bonded with each other via a substituent in their respective 4-positions. There may be no substituent in N-position of the 2,2,6,6-tetraalkylpiperidine skeleton, and a C1-4 alkyl group may be substituted in N-position thereof. The 2,2,6,6-tetraalkylpiperidine skeleton is preferably 2,2,6,6-tetramethylpiperidine skeleton.

Substituents in 4-position of the 2,2,6,6-tetraalkylpiperidine skeleton include acyloxy group ($R^{11}COO$—), alkoxy group ($R^{11}O$—), alkylamino group ($R^{11}NH$—), and acylamino group ($R^{11}CONH$—). $R^{11}$ is preferably a C1-30, more preferably a C1-24, and further preferably a C1-20 hydrocarbon group. Examples of the hydrocarbon group include alkyl group, alkenyl group, cycloalkyl group, alkylcycloalkyl group, aryl group, alkylaryl group, and arylalkyl group.

Examples of substituents when two 2,2,6,6-tetraalkylpiperidine skeletons are bonded with each other via a substituent in their respective 4-positions include hydrocarbylene bis(carbonyloxy) group (—OOC—$R^{12}$—COO—), hydrocarbylene diamino group (—HN—$R^{12}$—NH—), and hydrocarbylene bis(carbonylamino) group (—HNCO—$R^{12}$—CONH—). $R^{12}$ is preferably a C1-30 hydrocarbylene group, which is more preferably an alkylene group.

An acyloxy group is preferable as a substituent in 4-position of the skeleton of 2,2,6,6-tetraalkylpiperidine. One example of compounds having an acyloxy group in 4-position of the 2,2,6,6-tetraalkylpiperidine skeleton is an ester of 2,2,6,6-tetramethyl-4-piperidinol and a carboxylic acid. Examples of such a carboxylic acid include C8-20 linear or branched chain aliphatic carboxylic acids.

Examples of phenolic antioxidants include 4,4'-methylenebis(2,6-di-tert-butylphenol); 4,4'-bis(2,6-di-tert-butylphenol); 4,4'-bis(2-methyl-6-tert-butylphenol); 2,2'-methylenebis(4-ethyl-6-tert-butylphenol); 2,2'-methylenebis(4-methyl-6-tert-butylphenol); 4,4'-butylidenebis(3-methyl-6-tert-butylphenol); 4,4'-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol; 2,6-di-tert-butyl-4-ethylphenol; 2,4-dimethyl-6-tert-butylphenol; 2,6-di-tert-butyl-4-(N,N'-dimethylaminomethyl)phenol; 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis(3,5-di-tert-butyl-4-hydroxybenzyl) sulfide; 3-(3,5-di-tert-butyl-4-hydroxyphenyl)propionic acid esters; and 3-methyl-5-tert-butyl-4-hydroxyphenol fatty acid esters. Examples of 3-(3,5-di-tert-butyl-4-hydroxyphenyl)propionic acid esters include octyl 3-(3,5-di-tert-butyl-4-hydroxyphenyl)propionate; decyl 3-(3,5-di-text-butyl-4-hydroxyphenyl)propionate; dodecyl 3-(3,5-di-tert-butyl-4-hydroxyphenyl)propionate; tetradecyl 3-(3,5-di-tert-butyl-4-hydroxyphenyl)propionate; hexadecyl 3-(3,5-di-tert-butyl-4-hydroxyphenyl)propionate; octadecyl 3-(3,5-di-tert-butyl-4-hydroxyphenyl)propionate; pentaerythritol tetrakis[3-(3,5-di-tert-butyl-4-hydroxyphenyl) propionate]; and 2,2'-thiodiethylene bis[3-(3,5-di-tert-butyl-4-hydroxyphenyl)propionate].

The lubricating oil composition does not necessarily comprise the component (G). When the lubricating oil composition comprises an amine antioxidant as the component (G), the content thereof is preferably 0.005 mass % to 0.15 mass %, and more preferably 0.005 mass % to 0.12 mass %, in terms of nitrogen on the basis of the total mass of the lubricating oil composition. The content of the amine antioxidant at the above described upper limit or less can lead to improved electrical insulation of a fresh oil, and further improved electrical insulation of the oxidatively deteriorated composition.

When the lubricating oil composition comprises a phenolic antioxidant as the component (G), the content thereof is preferably 0.1 mass % to 1.5 mass %, and more preferably 0.1 mass % to 1.0 mass %, on the basis of the total mass of the lubricating oil composition. The content of the phenolic antioxidant at the above described upper limit or less can lead to improved electrical insulation of a fresh oil, and further improved electrical insulation of the oxidatively deteriorated composition.

<Other Additives>

In one embodiment, the lubricating oil composition may further comprise at least one additive selected from pour point depressants other than the component (A), anti-wear agents or extreme-pressure agents other than component (B), friction modifiers, corrosion inhibitors other than the components (C) and (E), metal deactivators other than the components (C) and (E), anti-rust agents, demulsifiers, anti-foaming agents, and coloring agents.

As a pour point depressant other than the component (A), any known pour point depressant such as a polymer which does not fall under the component (A) may be used without particular limitation. The lubricating oil composition does not necessarily comprise the pour point depressant. When the lubricating oil composition comprises the pour point depressant, the content thereof is preferably no more than 1 mass %, and more preferably no more than 0.5 mass %, on the basis of the total mass of the composition. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 0.1 mass %.

Examples of anti-wear agents or extreme-pressure agents other than component (B) include sulfur-containing compounds such as disulfides, sulfurized olefins, sulfurized oils, and dithiocarbamates, and phosphorus-containing anti-wear agents other than the component (B). Examples of phosphorus-containing anti-wear agents other than the component (B) include phosphoric acid, thiophosphoric acid, dithiophosphoric acid, trithiophosphoric acid, and complete or partial esters thereof; phosphorous acid, thiophosphorous acid, dithiophosphorous acid, trithiophosphorous acid, monoesters thereof, diesters thereof (excluding diesters represented by the general formula (1)), and triesters thereof. The lubricating oil composition does not necessarily comprise an anti-wear agent other than the component (B). When the lubricating oil composition comprises an anti-wear agents other than the component (B), the content thereof is preferably no more than 10 mass %, and more preferably no more than 5 mass %, on the basis of the total mass of the composition. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 1 mass %.

The lubricating oil composition may optionally comprise a phosphorus-containing anti-wear agent other than the component (B). The total phosphorus content in the lubricating oil composition is preferably no more than 0.06 mass %. The total phosphorus content in the lubricating oil composition at the above described upper limit or less can lead to improved electrical insulation of a fresh oil, and further improved electrical insulation of the oxidatively deteriorated composition. In one embodiment, the content of a phosphorus-containing anti-wear agent other than the component (B) in the lubricating oil composition is preferably no more than 0.05 mass %, more preferably no more than 0.03 mass %, and further preferably no more than 0.02 mass %, in terms of phosphorus on the basis of the total mass of the composition. The content of a phosphorus-containing anti-wear agent other than the component (B) at the above described upper limit or less can lead to improved electrical insulation of a fresh oil, and further improved electrical insulation of the oxidatively deteriorated composition.

As a friction modifier, for example, at least one friction modifier selected from organic molybdenum compounds and ashless friction modifiers may be used. The lubricating oil composition does not necessarily comprise a friction modifier. When the lubricating oil composition comprises a friction modifier, the content thereof is preferably no more than 2 mass %, and more preferably no more than 1 mass %, on the basis of the total mass of the composition. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 0.01 mass %.

Examples of organic molybdenum compounds include sulfur-containing organic molybdenum compounds, and organic molybdenum compounds which do not contain sulfur as a constituent element. Examples of sulfur-containing organic molybdenum compounds include sulfur-containing organic compounds such as molybdenum dithiocarbamate compounds; molybdenum dithiophosphate compounds; complexes of molybdenum compounds (examples thereof include: molybdenum oxides such as molybdenum dioxide and molybdenum trioxide; molybdenum acids such as orthomolybdic acid, paramolybdic acid, and sulfurized (poly)molybdic acid; molybdic acid salts such as metal salts and ammonium salts of these molybdic acids;

molybdenum sulfides such as molybdenum disulfide, molybdenum trisulfide, molybdenum pentasulfide, and molybdenum polysulfide; thiomolybdic acid; metal salts and amine salts of thiomolybdic acid; and molybdenum halides such as molybdenum chloride), and sulfur-containing organic compounds (examples thereof include: alkyl (thio) xanthate, thiadiazole, mercaptothiadiazole, thiocarbonate, tetrahydrocarbylthiuram disulfide, bis(di(thio)hydrocarbyl dithiophosphonate) disulfide, organic (poly)sulfide, and sulfurized ester) or other organic compounds; and sulfur-containing organic molybdenum compounds such as complexes of sulfur-containing molybdenum compounds such as the above described molybdenum sulfides and sulfurized molybdic acids, and alkenylsuccinimide. The organic molybdenum compound may be a mononuclear molybdenum compound, and may be a polynuclear molybdenum compound such as a binuclear molybdenum compound and a trinuclear molybdenum compound. Examples of organic molybdenum compounds which do not contain sulfur as a constituent element include molybdenum-amine complexes, molybdenum-succinimide complexes, molybdenum salts of organic acids, and molybdenum salts of alcohols.

The lubricating oil composition may optionally comprise a metal-containing additive other than the metallic detergent (such as organic molybdenum compounds and zinc dialkyl dithiophosphate). The total content of metal elements in the lubricating oil composition is preferably no more than 0.03 mass % in terms of metal on the basis of the total mass of the composition. The total content of metal elements in the lubricating oil composition at the above described upper limit or less can lead to further improved electrical insulation of a fresh oil and the oxidatively deteriorated composition. In one embodiment, the total content of a metal-containing additive other than the metallic detergent in the lubricating oil composition is preferably no more than 0.010 mass %, more preferably no more than 0.0075 mass %, and further preferably no more than 0.0050 mass %, in terms of metal on the basis of the total mass of the composition. The total content of a metal-containing additive other than the metallic detergent at the above described upper limit or less can lead to further improved electrical insulation of a fresh oil and the oxidatively deteriorated composition.

As an ashless friction modifier, any known oiliness agent-based friction modifier may be used without any limitation. Examples of the ashless friction modifier include C6-50 compounds containing, in their molecules, at least one heteroatom selected from an oxygen atom, a nitrogen atom and a sulfur atom. More specifically, an ashless friction modifier such as aliphatic amine compounds, aliphatic imide compounds, fatty acid esters, fatty acid amides, fatty acid hydrazides, fatty acid metal salts, aliphatic alcohols, aliphatic ethers, and aliphatic urea compounds, each having at least one C6-30, preferably C6-30 linear or branched chain alkyl or alkenyl group in their molecules, may be preferably used.

As a corrosion inhibitor other than the components (C) and (E), for example, any known corrosion inhibitor such as imidazole compounds may be used without particular limitation. The lubricating oil composition does not necessarily comprise a corrosion inhibitor other than the components (C) and (E). When the lubricating oil composition comprises a corrosion inhibitor other than the components (C) and (E), the content thereof is preferably no more than 1 mass %, and more preferably no more than 0.5 mass %. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 0.01 mass %.

As a metal deactivator other than the components (C) and (E), for example, any known metal deactivator such as imidazoline, pyrimidine derivatives, mercaptobenzothiazole, 2-(alkyldithio)benzimidazole, and β-(o-carboxybenzylthio)propionitrile may be used without particular limitation. The lubricating oil composition does not necessarily comprise a metal deactivator other than the components (C) and (E). When the lubricating oil composition comprises a metal deactivator other than the components (C) and (E), the content thereof is preferably no more than 1 mass %, and more preferably no more than 0.5 mass %. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 0.01 mass %.

As an anti-rust agent, for example, any known anti-rust agent such as petroleum sulfonate, alkylbenzenesulfonate, dinonylnaphthalenesulfonate, alkenylsuccinate esters, and polyol esters may be used without particular limitation. The lubricating oil composition does not necessarily comprise an anti-rust agent. When the lubricating oil composition comprises an anti-rust agent, the content thereof is preferably no more than 1 mass %, and more preferably no more than 0.5 mass %. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 0.01 mass %.

As a demulsifier, for example, any known demulsifier such as polyoxyalkylene glycol-based nonionic surfactants such as polyoxyethylene alkyl ether, polyoxyethylene alkylphenyl ether, and polyoxyethylene alkylnaphthyl ether may be used without particular limitation. The lubricating oil composition does not necessarily comprise a demulsifier. When the lubricating oil composition comprises a demulsifier, the content thereof is preferably no more than 5 mass %, and more preferably no more than 3 mass %. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 1 mass %.

As an anti-foaming agent, any known anti-foaming agent such as silicones, fluorosilicones, and fluoroalkyl ethers may be used. The lubricating oil composition does not necessarily comprise an anti-foaming agent. When the lubricating oil composition comprises an anti-foaming agent, the content thereof is preferably no more than 0.5 mass %, and more preferably no more than 0.1 mass %. The content thereof at the above described upper limit or less can lead to improved electrical insulation of a fresh oil, and further improved electrical insulation of the oxidatively deteriorated composition. The lower limit of the content thereof is not particularly restricted, but in one embodiment, can be no less than 0.0001 mass %.

As a coloring agent, for example, any known coloring agent such as azo compounds may be used.

<Lubricating Oil Composition>

The kinematic viscosity of the lubricating oil composition at 100° C. is 1.8 to 5.2 $mm^2/s$, and in one embodiment, can be 2.8 to 5.2 $mm^2/s$. The kinematic viscosity of the composition at 100° C. at the above described upper limit or less can lead to improved fuel efficiency. The kinematic viscosity of the composition at 100° C. at the above described lower limit or more can lead to improved anti-seizure performance, anti-wear performance, anti-fatigue performance, and electrical insulation of a fresh oil and the oxidatively deteriorated composition.

The kinematic viscosity of the lubricating oil composition at 40° C. is 4.0 to 20.0 $mm^2/s$, and in one embodiment, can be 10.2 to 18.3 $mm^2/s$. The kinematic viscosity of the composition at 40° C. at the above described upper limit or less can lead to improved fuel efficiency. The kinematic viscosity of the composition at 40° C. at the above described lower limit or more can lead to improved anti-seizure performance, anti-wear performance, anti-fatigue performance, and electrical insulation of a fresh oil and the oxidatively deteriorated composition.

The lubricating oil composition has the ratio [S]/[P] of 2.2 to 4.0, wherein the [S] represents a sulfur content (unit: mass %) in the lubricating oil composition, and the [P] represents a phosphorus content (unit: mass %) in the lubricating oil composition. The ratio [S]/[P] in one embodiment may be 2.25 to 4.0. The ratio [S]/[P] at the above described upper limit or less can lead to improved anti-seizure performance, and electrical insulation of a fresh oil and the oxidatively deteriorated composition. The ratio [S]/[P] at the above described lower limit or more can lead to improved anti-seizure performance and copper corrosion inhibition performance.

In one embodiment, the volume resistivity of an oxidatively deteriorated oil of the lubricating oil composition at 80° C. is preferably no less than $1.0\times10^9$ Ω·cm. In the present specification, the volume resistivity of the oxidatively deteriorated oil is volume resistivity of an oxidatively deteriorated oil measured at 80° C. in oil temperature, conforming to the volume resistivity test specified in JIS C2101: this oxidatively deteriorated oil is obtained by oxidation treatment on a fresh oil at 165° C. for 150 hours by the ISOT method (Indiana Stirring Oxidation Test) specified in JIS K2514-1.

In one embodiment, the total content of a compound (hereinafter may be referred to as "O/N-based active hydrogen compound") having a non-phenolic OH group (which may be a part of another functional group (such as carboxy group and phosphoric acid group)) or a salt thereof, >NH group, or —$NH_2$ group (hereinafter may be referred to as "O/N-based active hydrogen-containing group"), wherein the compound does not contribute to any content of a poly(meth)acrylate (such as the component (A)), a phosphite diester compound that does not have an O/N-based active hydrogen-containing group in its alcohol residue (such as the component (B)), a thiadiazole compound (the component (C)), a metallic detergent (such as a metal salicylate detergent such as the component (D), a metal sulfonate detergent, and a metal phenate detergent), a benzotriazol or tolyltriazole compound (the component (E)), a succinimide friction modifier (the component (F)), and an amine antioxidant or phenolic antioxidant (the component (G)), may be preferably 0 to 500 mass ppm, in one embodiment 0 to 300 mass ppm, and in another embodiment 0 to 150 mass ppm, on the basis of the total mass of the lubricating oil composition in terms of the sum of oxygen element content and nitrogen element content. Examples of such an O/N-based active hydrogen compound include phosphoric acid (which may be in a form of a salt) and partial esters thereof; phosphorous acid (which may be in a form of a salt) and partial esters thereof (phosphite diester compounds that do not have the above described O/N-based active hydrogen-containing group in their alcohol residue shall not fall under an O/N-based active hydrogen compound); nitrogen-containing oiliness agent-based friction modifiers having a N—H bond (such as primary fatty amines, secondary fatty amines, fatty acid primary amides, fatty acid secondary amides, aliphatic ureas having a N—H bond, and fatty acid hydrazides); nitrogen-containing oiliness agent-based friction modifiers having a hydroxy group (such as amides of fatty acids and primary or secondary alkanolamines, and amides of primary or secondary fatty amines and aliphatic hydroxy acids); nitrogen-containing oiliness agent-based friction modifiers having a carboxy group (which may be in a form of a salt) (such as N-acylated amino acids); oiliness agent-based friction modifiers having a hydroxy group (such as glycerol monooleate), and oiliness agent-based friction modifiers having a carboxy group (may be in a form of a salt) (such as fatty acids and fatty acid metal salts). When one O/N-based active hydrogen compound comprises both an oxygen element and a nitrogen element, both of the amounts of oxygen element and nitrogen element derived from the compound shall contribute to the total content of the O/N-based active hydrogen compound (total amount of oxygen and nitrogen elements) irrespective of whether each oxygen atom of the compound is bonded to a hydrogen atom and irrespective of whether each nitrogen atom of the compound is bonded to a hydrogen atom. The total content of the O/N-based active hydrogen compound at the above described upper limit or less can lead to improved electrical insulation of a fresh oil, and further improved electrical insulation of the oxidatively deteriorated oil.

(Use)

The lubricating oil composition of the present invention has balanced electrical insulation of the oxidatively deteriorated composition, anti-seizure performance, copper corrosion inhibition performance, and anti-fatigue performance, and thus may be preferably used as an electric motor oil, a transmission oil, a common lubricating oil for electric motors and transmissions (gear mechanisms), or a lubricating oil for electric drive modules including an electric motor and a transmission (gear mechanism). In one embodiment, the lubricating oil composition of the present invention may be preferably used for lubrication of electric motors in automobiles including the electric motor, or lubrication of electric motors and transmissions in automobiles including the electric motor and the transmission (gear mechanism).

EXAMPLES

Hereinafter, the present invention will be further specifically described based on examples and comparative examples. The present invention is not limited to these examples.

Examples 1 to 15 and Comparative Examples 1 to 9

As shown in tables 1 to 5, lubricating oil compositions of the present invention (examples 1 to 15), and lubricating oil compositions for comparison (comparative examples 1 to 9) were each prepared. In the tables, "mass %" for the base oil components O-1 to O-4 means mass % on the basis of the total mass of the base oils (the total mass of the base oils are defined as 100 mass %), and "mass %" for the total base oil and the additives means mass % on the basis of the total mass of the composition (the total mass of the composition is defined as 100 mass %); and "mass ppm" means mass ppm on the basis of the total mass of the composition. Details of the components are as follows.

(Lubricating Base Oil)

O-1: hydrorefined mineral oil (Group II, kinematic viscosity (40° C.): 7.1 $mm^2/s$, kinematic viscosity (100° C.): 2.2 $mm^2/s$, viscosity index: 109, sulfur content: less than 1 mass ppm)

O-2: hydrorefined mineral oil (Group III, kinematic viscosity (40° C.): 19.5 $mm^2/s$, kinematic viscosity (100° C.): 4.2 $mm^2/s$, viscosity index: 125, sulfur content: less than 1 mass ppm)

O-3: poly-α-olefin base oil (Group IV, kinematic viscosity (40° C.): 5.0 $mm^2/s$, kinematic viscosity (100° C.): 1.7 $mm^2/s$)

O-4: poly-α-olefin base oil (Group IV, kinematic viscosity (40° C.): 18.4 $mm^2/s$, kinematic viscosity (100° C.): 4.1 $mm^2/s$, viscosity index: 124)

((A) Poly(meth)acrylate Viscosity Index Improver)

A-1: non-dispersant poly(meth)acrylate viscosity index improver, weight average molecular weight: 20,000

A-2: non-dispersant poly(meth)acrylate viscosity index improver, weight average molecular weight: 50,000

((B) Phosphite ester Compound)

B-1: bis(3-thiaundecyl) hydrogen phosphite

B-2*: dibutyl hydrogen phosphite ((C) Thiadiazole Compound)

C-1: thiadiazole compound represented by any of the general formulae (3) to (5) where $R^5$ and $R^6$ were both branched chain nonyl group, and a=b=2, S content: 35 mass %

((D) Metallic Detergent)

D-1: calcium salicylate detergent, base number: 325 mgKOH/g, Ca content: 13.0 mass %

D-2*: calcium sulfonate detergent, base number: 300 mgKOH/g, Ca content: 12.0 mass %

((E) Benzotriazol/tolyltriazole Metal Deactivator)

E-1: tolyltriazole metal deactivator ((F) Succinimide Ashless Dispersant)

F-1: boronated succinimide ashless dispersant, N content: 1.3 mass %, B content: 0.3 mass %

((G) Antioxidant)

G-1: amine antioxidant, N content: 4.0 mass %

TABLE 1

| | | Examples | | | | |
|---|---|---|---|---|---|---|
| | | 1 | 2 | 3 | 4 | 5 |
| Base oil composition | | | | | | |
| O-1 | mass % | 85 | — | 85 | 85 | 85 |
| O-2 | mass % | 15 | — | 15 | 15 | 15 |
| O-3 | mass % | — | 50 | — | — | — |
| O-4 | mass % | — | 50 | — | — | — |
| Total | mass % | 100 | 100 | 100 | 100 | 100 |
| Properties of total base oil | | | | | | |
| Kinematic viscosity (40° C.) | $mm^2/s$ | 8.7 | 8.9 | 8.7 | 8.7 | 8.7 |
| Kinematic viscosity (100° C.) | $mm^2/s$ | 2.5 | 2.5 | 2.5 | 2.5 | 2.5 |
| Total base oil | mass % | 82 | 82 | 84 | 88 | 90 |
| (A) PMA viscosity index improver | | | | | | |
| A-1 | mass % | 10.0 | 10.0 | 8.0 | 4.0 | 2.0 |
| A-2 | mass % | — | — | — | — | — |
| (B) Phosphite ester | | | | | | |
| B-1 | mass % (P) | 0.040 | 0.040 | 0.040 | 0.040 | 0.040 |
| B-2* | mass % (P) | — | — | — | — | — |
| (C) Thiadiazole compound | | | | | | |
| C-1 | mass % | 0.100 | 0.100 | 0.100 | 0.100 | 0.100 |
| (D) Metallic detergent | | | | | | |
| D-1 | mass % (Ca) | 0.015 | 0.015 | 0.015 | 0.015 | 0.015 |
| D-2* | mass % (Ca) | — | — | — | — | — |
| (E) Metal deactivator | | | | | | |
| E-1 | mass % | 0.050 | 0.050 | 0.050 | 0.050 | 0.050 |
| (F) Ashless dispersant | | | | | | |
| F-1 | mass % (N) | 0.050 | 0.050 | 0.050 | 0.050 | 0.050 |
| (G) Antioxidant | | | | | | |
| G-1 | mass % (N) | 0.020 | 0.020 | 0.020 | 0.020 | 0.020 |
| Properties of composition | | | | | | |
| Kinematic viscosity (40° C.) | $mm^2/s$ | 13.2 | 13.8 | 12.3 | 10.8 | 10.2 |
| Kinematic viscosity (100° C.) | $mm^2/s$ | 3.7 | 3.7 | 3.4 | 3.0 | 2.8 |
| Viscosity index | | 181 | 170 | 169 | 143 | 130 |
| S content (S) in composition | mass % (S) | 0.10 | 0.10 | 0.10 | 0.10 | 0.10 |
| P content (P) in composition | mass % (P) | 0.04 | 0.04 | 0.04 | 0.04 | 0.04 |
| S/P | — | 2.50 | 2.50 | 2.50 | 2.50 | 2.50 |

TABLE 1-continued

| | | Examples | | | | |
|---|---|---|---|---|---|---|
| | | 1 | 2 | 3 | 4 | 5 |
| Volume resistivity (80° C.) | | | | | | |
| Fresh oil | $10^{10}$ Ω · cm | 0.34 | 0.35 | 0.32 | 0.30 | 0.28 |
| Oxidatively deteriorated oil | $10^{10}$ Ω · cm | 0.21 | 0.21 | 0.20 | 0.19 | 0.18 |
| SRV seizure test | | | | | | |
| Seizure load | N | 1800 | 1800 | 1800 | 1800 | 1800 |
| Copper strip corrosion test | | | | | | |
| Corrosion class | | 1 | 1 | 1 | 1 | 1 |
| Unisteel test | | | | | | |
| Fatigue life L50 | h | 20 | 20 | 19 | 18 | 18 |

TABLE 2

| | | Examples | | | | |
|---|---|---|---|---|---|---|
| | | 6 | 7 | 8 | 9 | 10 |
| Base oil composition | | | | | | |
| O-1 | mass % | 85 | 85 | 85 | 85 | 85 |
| O-2 | mass % | 15 | 15 | 15 | 15 | 15 |
| O-3 | mass % | — | — | — | — | — |
| O-4 | mass % | — | — | — | — | — |
| Total | mass % | 100 | 100 | 100 | 100 | 100 |
| Properties of total base oil | | | | | | |
| Kinematic viscosity (40° C.) | $mm^2/s$ | 8.7 | 8.7 | 8.7 | 8.7 | 8.7 |
| Kinematic viscosity (100° C.) | $mm^2/s$ | 2.5 | 2.5 | 2.5 | 2.5 | 2.5 |
| Total base oil | mass % | 82 | 84 | 88 | 90 | 82 |
| (A) PMA viscosity index improver | | | | | | |
| A-1 | mass % | — | — | — | — | 10.0 |
| A-2 | mass % | 10.0 | 8.0 | 4.0 | 2.0 | — |
| (B) Phosphite ester | | | | | | |
| B-1 | mass % (P) | 0.040 | 0.040 | 0.040 | 0.040 | 0.010 |
| B-2* | mass % (P) | — | — | — | — | — |
| (C) Thiadiazole compound | | | | | | |
| C-1 | mass % | 0.100 | 0.100 | 0.100 | 0.100 | 0.100 |
| (D) Metallic detergent | | | | | | |
| D-1 | mass % (Ca) | 0.015 | 0.015 | 0.015 | 0.015 | 0.015 |
| D-2* | mass % (Ca) | — | — | — | — | — |
| (E) Metal deactivator | | | | | | |
| E-1 | mass % | 0.050 | 0.050 | 0.050 | 0.050 | 0.050 |
| (F) Ashless dispersant | | | | | | |
| F-1 | mass % (N) | 0.050 | 0.050 | 0.050 | 0.050 | 0.050 |
| (G) Antioxidant | | | | | | |
| G-1 | mass % (N) | 0.020 | 0.020 | 0.020 | 0.020 | 0.020 |
| Properties of composition | | | | | | |
| Kinematic viscosity (40° C.) | $mm^2/s$ | 18.3 | 16.0 | 12.4 | 11.0 | 13.2 |
| Kinematic viscosity (100° C.) | $mm^2/s$ | 5.2 | 4.6 | 3.5 | 3.1 | 3.7 |
| Viscosity index | | 246 | 228 | 180 | 148 | 181 |
| S content (S) in composition | mass % (S) | 0.10 | 0.10 | 0.10 | 0.10 | 0.04 |
| P content (P) in composition | mass % (P) | 0.04 | 0.04 | 0.04 | 0.04 | 0.01 |
| S/P | — | 2.50 | 2.50 | 2.50 | 2.50 | 4.00 |
| Volume resistivity (80° C.) | | | | | | |
| Fresh oil | $10^{10}$ Ω · cm | 0.36 | 0.34 | 0.31 | 0.29 | 0.36 |
| Oxidatively deteriorated oil | $10^{10}$ Ω · cm | 0.23 | 0.21 | 0.18 | 0.17 | 0.24 |

TABLE 2-continued

| | | Examples | | | | |
|---|---|---|---|---|---|---|
| | | 6 | 7 | 8 | 9 | 10 |
| SRV seizure test | | | | | | |
| Seizure load | N | 1800 | 1800 | 1800 | 1800 | 1800 |
| Copper strip corrosion test | | | | | | |
| Corrosion class | | 1 | 1 | 1 | 1 | 1 |
| Unisteel test | | | | | | |
| Fatigue life L50 | h | 20 | 20 | 19 | 20 | 18 |

TABLE 3

| | | Examples | | | | |
|---|---|---|---|---|---|---|
| | | 11 | 12 | 13 | 14 | 15 |
| Base oil composition | | | | | | |
| O-1 | mass % | 85 | 85 | 85 | 85 | 85 |
| O-2 | mass % | 15 | 15 | 15 | 15 | 15 |
| O-3 | mass % | — | — | — | — | — |
| O-4 | mass % | — | — | — | — | — |
| Total | mass % | 100 | 100 | 100 | 100 | 100 |
| Properties of total base oil | | | | | | |
| Kinematic viscosity (40° C.) | $mm^2/s$ | 8.7 | 8.7 | 8.7 | 8.7 | 8.7 |
| Kinematic viscosity (100° C.) | $mm^2/s$ | 2.5 | 2.5 | 2.5 | 2.5 | 2.5 |
| Total base oil | mass % | 82 | 82 | 82 | 82 | 87 |
| (A) PMA viscosity index improver | | | | | | |
| A-1 | mass % | 10.0 | 5.0 | 10.0 | 10.0 | 10.0 |
| A-2 | mass % | — | 5.0 | — | — | — |
| (B) Phosphite ester | | | | | | |
| B-1 | mass % (P) | 0.060 | 0.040 | 0.040 | 0.040 | 0.040 |
| B-2* | mass % (P) | — | — | — | — | — |
| (C) Thiadiazole compound | | | | | | |
| C-1 | mass % | 0.100 | 0.100 | 0.010 | 0.200 | 0.100 |
| (D) Metallic detergent | | | | | | |
| D-1 | mass % (Ca) | 0.015 | 0.015 | 0.015 | 0.015 | 0.015 |
| D-2* | mass % (Ca) | — | — | — | — | — |
| (E) Metal deactivator | | | | | | |
| E-1 | mass % | 0.050 | 0.050 | 0.050 | 0.050 | — |
| (F) Ashless dispersant | | | | | | |
| F-1 | mass % (N) | 0.050 | 0.050 | 0.050 | 0.050 | — |
| (G) Antioxidant | | | | | | |
| G-1 | mass % (N) | 0.020 | 0.020 | 0.020 | 0.020 | — |
| Properties of composition | | | | | | |
| Kinematic viscosity (40° C.) | $mm^2/s$ | 13.2 | 15.6 | 13.2 | 13.2 | 12.8 |
| Kinematic viscosity (100° C.) | $mm^2/s$ | 3.7 | 4.4 | 3.7 | 3.7 | 3.6 |
| Viscosity index | | 181 | 216 | 181 | 181 | 180 |
| S content (S) in composition | mass % (S) | 0.14 | 0.10 | 0.09 | 0.12 | 0.10 |
| P content (P) in composition | mass % (P) | 0.06 | 0.04 | 0.04 | 0.04 | 0.04 |
| S/P | — | 2.33 | 2.50 | 2.25 | 3.00 | 2.50 |
| Volume resistivity (80° C.) | | | | | | |
| Fresh oil | $10^{10}$ Ω · cm | 0.23 | 0.34 | 0.35 | 0.31 | 0.34 |
| Oxidatively deteriorated oil | $10^{10}$ Ω · cm | 0.12 | 0.22 | 0.21 | 0.18 | 0.18 |
| SRV seizure test | | | | | | |
| Seizure load | N | 1800 | 1800 | 1800 | 1800 | 1800 |
| Copper strip corrosion test | | | | | | |
| Corrosion class | | 1 | 1 | 1 | 1 | 1 |

TABLE 3-continued

| | | Examples | | | | |
|---|---|---|---|---|---|---|
| | | 11 | 12 | 13 | 14 | 15 |
| Unisteel test | | | | | | |
| Fatigue life L50 | h | 20 | 20 | 20 | 20 | 21 |

TABLE 4

| | | Comparative examples | | | | |
|---|---|---|---|---|---|---|
| | | 1 | 2 | 3 | 4 | 5 |
| Base oil composition | | | | | | |
| O-1 | mass % | 85 | 85 | 85 | 85 | 85 |
| O-2 | mass % | 15 | 15 | 15 | 15 | 15 |
| O-3 | mass % | — | — | — | — | — |
| O-4 | mass % | — | — | — | — | — |
| Total | mass % | 100 | 100 | 100 | 100 | 100 |
| Properties of total base oil | | | | | | |
| Kinematic viscosity (40° C.) | $mm^2/s$ | 8.7 | 8.7 | 8.7 | 8.7 | 8.7 |
| Kinematic viscosity (100° C.) | $mm^2/s$ | 2.5 | 2.5 | 2.5 | 2.5 | 2.5 |
| Total base oil | mass % | 92 | 82 | 82 | 82 | 82 |
| (A) PMA viscosity index improver | | | | | | |
| A-1 | mass % | — | 10.0 | 10.0 | 10.0 | 10.0 |
| A-2 | mass % | — | — | — | — | — |
| (B) Phosphite ester | | | | | | |
| B-1 | mass % (P) | 0.040 | 0.005 | 0.070 | 0.040 | 0.040 |
| B-2* | mass % (P) | — | — | — | — | — |
| (C) Thiadiazole compound | | | | | | |
| C-1 | mass % | 0.100 | 0.100 | 0.100 | 0.005 | 0.500 |
| (D) Metallic detergent | | | | | | |
| D-1 | mass % (Ca) | 0.015 | 0.015 | 0.015 | 0.015 | 0.015 |
| D-2* | mass % (Ca) | — | — | — | — | — |
| (E) Metal deactivator | | | | | | |
| E-1 | mass % | 0.050 | 0.050 | 0.050 | 0.050 | 0.050 |
| (F) Ashless dispersant | | | | | | |
| F-1 | mass % (N) | 0.050 | 0.050 | 0.050 | 0.050 | 0.050 |
| (G) Antioxidant | | | | | | |
| G-1 | mass % (N) | 0.020 | 0.020 | 0.020 | 0.020 | 0.020 |
| Properties of composition | | | | | | |
| Kinematic viscosity (40° C.) | $mm^2/s$ | 9.7 | 13.2 | 13.2 | 13.2 | 13.2 |
| Kinematic viscosity (100° C.) | $mm^2/s$ | 2.7 | 3.7 | 3.7 | 3.7 | 3.7 |
| Viscosity index | | 116 | 181 | 181 | 181 | 181 |
| S content (S) in composition | mass % (S) | 0.10 | 0.03 | 0.16 | 0.08 | 0.18 |
| P content (P) in composition | mass % (P) | 0.04 | 0.01 | 0.07 | 0.04 | 0.04 |
| S/P | — | 2.50 | 6.00 | 2.29 | 2.00 | 4.50 |
| Volume resistivity (80° C.) | | | | | | |
| Fresh oil | $10^{10}\ \Omega \cdot cm$ | 0.26 | 0.36 | 0.18 | 0.35 | 0.18 |
| Oxidatively deteriorated oil | $10^{10}\ \Omega \cdot cm$ | 0.17 | 0.24 | 0.08 | 0.21 | 0.07 |
| SRV seizure test | | | | | | |
| Seizure load | N | 1000 | 1000 | 1000 | 1800 | 1800 |
| Copper strip corrosion test | | | | | | |
| Corrosion class | | 1 | 1 | 1 | 2 | 1 |
| Unisteel test | | | | | | |
| Fatigue life L50 | h | 20 | 18 | 20 | 20 | 20 |

TABLE 5

| | | Comparative examples | | | |
|---|---|---|---|---|---|
| | | 6 | 7 | 8 | 9 |
| Base oil composition | | | | | |
| O-1 | mass % | 85 | 85 | 85 | 85 |
| O-2 | mass % | 15 | 15 | 15 | 15 |
| O-3 | mass % | — | — | — | — |
| O-4 | mass % | — | — | — | — |
| Total | mass % | 100 | 100 | 100 | 100 |
| Properties of total base oil | | | | | |
| Kinematic viscosity (40° C.) | $mm^2/s$ | 8.7 | 8.7 | 8.7 | 8.7 |
| Kinematic viscosity (100° C.) | $mm^2/s$ | 2.5 | 2.5 | 2.5 | 2.5 |
| Total base oil | mass % | 82 | 82 | 82 | 82 |
| (A) PMA viscosity index improver | | | | | |
| A-1 | mass % | 10.0 | 10.0 | 10.0 | 10.0 |
| A-2 | mass % | — | — | — | — |
| (B) Phosphite ester | | | | | |
| B-1 | mass % (P) | 0.040 | 0.040 | 0.040 | — |
| B-2* | mass % (P) | — | — | — | 0.040 |
| (C) Thiadiazole compound | | | | | |
| C-1 | mass % | 0.100 | 0.100 | 0.100 | 0.100 |
| (D) Metallic detergent | | | | | |
| D-1 | mass % (Ca) | — | 0.040 | — | 0.015 |
| D-2* | mass % (Ca) | — | — | 0.015 | — |
| (E) Metal deactivator | | | | | |
| E-1 | mass % | 0.050 | 0.050 | 0.050 | 0.050 |
| (F) Ashless dispersant | | | | | |
| F-1 | mass % (N) | 0.050 | 0.050 | 0.050 | 0.050 |
| (G) Antioxidant | | | | | |
| G-1 | mass % (N) | 0.020 | 0.020 | 0.020 | 0.020 |
| Properties of composition | | | | | |
| Kinematic viscosity (40° C.) | $mm^2/s$ | 13.2 | 13.2 | 13.2 | 13.2 |
| Kinematic viscosity (100° C.) | $mm^2/s$ | 3.7 | 3.7 | 3.7 | 3.7 |
| Viscosity index | | 181 | 181 | 181 | 181 |
| S content (S) in composition | mass % (S) | 0.10 | 0.10 | 0.10 | 0.02 |
| P content (P) in composition | mass % (P) | 0.04 | 0.04 | 0.04 | 0.04 |
| S/P | — | 2.50 | 2.50 | 2.50 | 0.50 |
| Volume resistivity (80° C.) | | | | | |
| Fresh oil | $10^{10}$ Ω · cm | 0.36 | 0.18 | 0.33 | 0.28 |
| Oxidatively deteriorated oil | $10^{10}$ Ω · cm | 0.18 | 0.08 | 0.20 | 0.12 |
| SRV seizure test | | | | | |
| Seizure load | N | 1800 | 1800 | 1800 | 1200 |
| Copper strip corrosion test | | | | | |
| Corrosion class | | 1 | 1 | 1 | 1 |
| Unisteel test | | | | | |
| Fatigue life L50 | h | 11 | 19 | 10 | 18 |

(Volume Resistivity)

The volume resistivity of a fresh oil, and the volume resistivity of an oxidatively deteriorated oil were measured for each lubricating oil composition. The oxidatively deteriorated oil was obtained by oxidation treatment on the fresh oil at 165° C. in oil temperature for 150 hours by the ISOT (Indiana Stirring Oxidation Test) method, conforming to JIS K2514-1. The volume resistivity of a fresh oil, and the volume resistivity of an oxidatively deteriorated oil were each measured at 80° C. in oil temperature, conforming to the volume resistivity test specified in JIS C2101. The results are shown in tables 1 to 5. In this test, higher volume resistivity means better electrical insulation. The volume resistivity of the oxidatively deteriorated oil at 80° C. in this test is preferably no less than $0.10\times10^{10}$ Ω·cm.

(SRV Test)

Anti-seizure performance of each lubricating oil composition was evaluated using a ball-on-disk type reciprocating friction wear testing machine (SRV tribological test machine manufactured by Optimol, ball and disk: 10 mm in diameter, disk: 24 mm in diameter and 7.9 mm in thickness; both equivalent to the material SUJ-2). Test conditions were 40° C. in temperature, 50 Hz in frequency, and 1.0 mm in amplitude. Friction test was conducted at 50 N in load for 5 minutes first, and then at 100 N in load for 5 minutes; and thereafter, a cycle of increasing the load by 100 N and checking occurrence of seizure after 5 minutes of friction at the load was repeated. Occurrence of seizure was determined by a rapid increase of the friction coefficient to no less than 0.3. The load at the time point when seizure occurred was measured as a seizure load. When seizure did not occur even after friction at 1800 N in load for 5 minutes, the seizure load was defined as "1800 N". The results are shown in tables 1 to 5. A greater seizure load in this test means better anti-seizure performance.

(Copper Strip Corrosion Test)

Copper corrosion inhibition performance of the fresh oil of each lubricating oil composition was evaluated. The test was carried out at 100° C. in oil temperature for 3 hours conforming to the copper strip corrosion test specified in JIS K2513. The results are shown in tables 1 to 5. In this test, a lower evaluation value (corrosion class) means a lower so degree of corrosion of a copper strip, that is, better copper corrosion inhibition performance.

(Unisteel Test)

For each lubricating oil composition, a rolling fatigue life of a thrust bearing was measured by a Unisteel test (IP305/79, The Institute of Petroleum) using a Unisteel rolling fatigue testing machine (triple-type high-temperature rolling fatigue testing machine (TRF-1000/3-01H) manufactured by Tokyo Koki Testing Machine Co. Ltd.). Time until either a roller or a test piece suffered fatigue damage was measured for a test bearing made by replacing a bearing ring in one side of a thrust needle bearing (FNTA-2542C manufactured by NSK Ltd.) with a flat test piece (material: SUJ2), under the conditions of: 7000 N in load; 2 GPa in surface pressure; 1450 rpm in rotation speed; and 120° C. in oil temperature. It was determined that fatigue damage occurred when the vibration acceleration of a testing portion measured by a vibration accelerometer installed in the Unisteel rolling fatigue testing machine reached 1.5 $m/s^2$. The test was repeated ten times, and then a fatigue life was calculated as the 50% life (L50: time for the cumulative probability to be 50%) by a Weibull plot based on the time it had taken for fatigue damage to occur in the tests. The results are shown in tables 1 to 5. A longer 50% life measured in this test means better anti-fatigue performance.

(Evaluation Results)

The lubricating oil compositions of examples 1 to 15 showed good results in electrical insulation of the oxidatively deteriorated composition, anti-seizure performance, copper corrosion inhibition performance, and anti-fatigue performance.

The lubricating oil composition of comparative example 1, which did not comprise the component (A), showed results inferior in anti-seizure performance.

The lubricating oil composition of comparative example 2, which comprised too low a content of the component (B), showed results inferior in anti-seizure performance.

The lubricating oil composition of comparative example 3, which comprised too high a content of the component (B), showed results inferior in electrical insulation of the oxidatively deteriorated composition, and anti-seizure performance.

The lubricating oil composition of comparative example 4, which comprised too low a content of the component (C), showed results inferior in copper corrosion inhibition performance.

The lubricating oil composition of comparative example 5, which comprised too high a content of the component (C), showed results inferior in electrical insulation of the oxidatively deteriorated composition.

The lubricating oil composition of comparative example 6, which did not comprise the component (D), showed results inferior in anti-fatigue performance.

The lubricating oil composition of comparative example 7, which comprised too high a content of the component (D), showed results inferior in electrical insulation of the oxidatively deteriorated composition.

The lubricating oil composition of comparative example 8, which comprised a calcium sulfonate detergent as the component (D) instead of a calcium salicylate detergent, showed results inferior in anti-fatigue performance.

The lubricating oil composition of comparative example 9, which comprised a phosphite ester compound that did not fall under any compound represented by the general formula (1) as the component (B) instead of a phosphite ester compound represented by the general formula (1), showed results inferior in anti-seizure performance.

We claim:

[1. A lubricating oil composition comprising:

a lubricating base oil comprising at least one mineral base oil, at least one synthetic base oil, or any mixture thereof, and having a kinematic viscosity at 40° C. of 5.0 to 15.0 $mm^2/s$ and a kinematic viscosity at 100° C. of 1.7 to 3.5 $mm^2/s$;

(A) a poly(meth)acrylate viscosity index improver having a weight average molecular weight of no more than 50,000, in an amount of 2 to 10 mass % on the basis of the total mass of the composition;

(B) a phosphite ester compound represented by the following general formula (1), in an amount of 0.01 to 0.06 mass % in terms of phosphorus on the basis of the total mass of the composition;

(C) a thiadiazole compound in an amount of 0.01 to 0.2 mass % on the basis of the total mass of the composition; and (D) a calcium salicylate detergent in an amount of 0.005 to 0.03 mass % in terms of calcium on the basis of the total mass of the composition, wherein the lubricating oil composition has a kinematic viscosity at 40° C. of 4.0 to 20.0 $mm^2/s$, and a kinematic viscosity at 100° C. of 1.8 to 5.2 $mm^2/s$; and the lubricating oil composition has a ratio [S]/[P] of 2.2 to 4.0, wherein the [S] represents a sulfur content (unit: mass %) in the lubricating oil composition, and the [P] represents a phosphorus content (unit: mass %) in the lubricating oil composition:

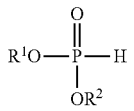

(1)

wherein in the general formula (1), $R^1$ and $R^2$ are each independently a group having 5 to 20 carbons represented by the following general formula (2); and

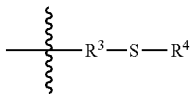

(2)

wherein in the general formula (2), $R^3$ is a C2-17 linear chain hydrocarbon group, and $R^4$ is a C2-17 linear chain hydrocarbon group.]

[2. The lubricating oil composition according to claim 1, further comprising:

(E) a tolyltriazole metal deactivator and/or a benzotriazole metal deactivator, in an amount of 0.001 to 0.1 mass % on the basis of the total mass of the composition.]

[3. The lubricating oil composition according to claim 1, further comprising:

optionally (F) a succinimide ashless dispersant in an amount of no more than 0.1 mass % in terms of nitrogen on the basis of the total mass of the composition, the component (F) being a condensation product of an alkyl- or alkenylsuccinic acid or anhydride thereof and a polyamine, and/or a derivative thereof, the alkyl- or alkenylsuccinic acid having a C40-400 alkyl or alkenyl group.]

[4. The lubricating oil composition according to claim 1, wherein the component (A) is a poly(meth)acrylate having a weight average molecular weight of 10,000 to 50,000.]

[5. The lubricating oil composition according to claim 1, wherein the composition comprises 3 to 10 mass % of the component (A) on the basis of the total mass of the composition.]

[6. The lubricating oil composition according to claim 1, wherein the composition comprises 5 to 10 mass % of the component (A) on the basis of the total mass of the composition.]

[7. The lubricating oil composition according to claim 1, wherein the component (A) is a non-dispersant poly (meth)acrylate.]

[8. The lubricating oil composition according to claim 1, wherein the composition is used to lubricate an electric motor or to lubricate the electric motor and a transmission, in an automobile comprising the electric motor.]

[9. A method for lubricating an electric motor of an automobile, the automobile comprising the electric motor, the method comprising:

lubricating the electric motor of the automobile, by means of the lubricating oil composition as in claim 1.]

[10. A method for lubricating an electric motor and a transmission of an automobile, the automobile comprising the electric motor and the transmission, the method comprising:

lubricating the electric motor and the transmission of the automobile, by means of the lubricating oil composition as in claim 1.]

[11. A lubricating oil composition consisting of:

a lubricating base oil consisting of at least one Group II base oil of API base stock categories, at least one Group III base oil of API base stock categories, or at least one Group IV base oil of API base stock categories, or any mixture thereof, and having a kinematic viscosity at 40° C. of 5.0 to 15.0 $mm^2/s$ and a kinematic viscosity at 100° C. of 1.7 to 3.5 $mm^2/s$; and at least one additive, the at least one additive comprising:

(A) a poly(meth)acrylate viscosity index improver having a weight average molecular weight of no more than 50,000, in an amount of 2 to 10 mass % on the basis of the total mass of the composition;

(B) a phosphite ester compound represented by the following general formula (1), in an amount of 0.01 to 0.06 mass % in terms of phosphorus on the basis of the total mass of the composition;

(C) a thiadiazole compound in an amount of 0.01 to 0.2 mass % on the basis of the total mass of the composition; and (D) a calcium salicylate detergent in an amount of 0.005 to 0.03 mass % in terms of calcium on the basis of the total mass of the composition, wherein the lubricating oil composition has a kinematic viscosity at 40° C. of 4.0 to 20.0 $mm^2/s$, and a kinematic viscosity at 100° C. of 1.8 to 5.2 $mm^2/s$; and the lubricating oil composition has a ratio [S]/[P] of 2.2 to 4.0, wherein the [S] represents a sulfur content (unit: mass %) in the lubricating oil composition, and the [P] represents a phosphorus content (unit: mass %) in the lubricating oil composition:

(1)

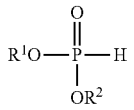

wherein in the general formula (1), $R^1$ and $R^2$ are each independently a group having 5 to 20 carbons represented by the following general formula (2); and (2)

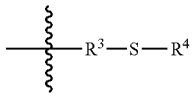

wherein in the general formula (2), $R^3$ is a C2-17 linear chain hydrocarbon group, and $R^4$ is a C2-17 linear chain hydrocarbon group.]

*12. A lubricating oil composition comprising:*

*a lubricating base oil comprising at least one mineral base oil, at least one synthetic base oil, or any mixture thereof, and having a kinematic viscosity at 40° C. of 5.0 to 15.0 $mm^2/s$ and a kinematic viscosity at 100° C. of 1.7 to 3.5 $mm^2/s$;*

*(A) a poly(meth)acrylate viscosity index improver having a weight average molecular weight of no more than 50,000, in an amount of 2 to 10 mass % on the basis of the total mass of the composition;*

*(B) a phosphite ester compound represented by the following general formula (1), in an amount of 0.01 to 0.06 mass % in terms of phosphorus on the basis of the total mass of the composition;*

*(C) a thiadiazole compound in an amount of 0.01 to 0.2 mass % on the basis of the total mass of the composition; and*

*(D) a calcium salicylate detergent in an amount of 0.005 to 0.03 mass % in terms of calcium on the basis of the total mass of the composition,*

*wherein the lubricating oil composition has a kinematic viscosity at 40° C. of 4.0 to 20.0 $mm^2/s$, and a kinematic viscosity at 100° C. of 1.8 to 5.2 $mm^2/s$;*

*a total content of any metallic detergent in the lubricating oil composition is 0.005 to 0.03 mass % in terms of metal on the basis of the total mass of the composition; and*

*the lubricating oil composition has a ratio [S]/[P] of 2.2 to 4.0, wherein the [S] represents a sulfur content (unit: mass %) in the lubricating oil composition, and the [P]*

*represents a phosphorus content (unit: mass %) in the lubricating oil composition:*

(1)

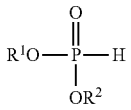

*wherein in the general formula (1), $R^2$ and $R^2$ are each independently a group having 5 to 20 carbons represented by the following general formula (2); and*

(2)

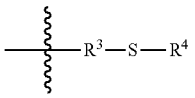

*wherein in the general formula (2), $R^3$ is a C2-17 linear chain hydrocarbon group, and $R^4$ is a C2-17 linear chain hydrocarbon group.*

*13. The lubricating oil composition according to claim 12, further comprising:*

*(E) a tolyltriazole metal deactivator and/or a benzotriazole metal deactivator, in an amount of 0.001 to 0.1 mass % on the basis of the total mass of the composition.*

*14. The lubricating oil composition according to claim 12, further comprising:*

*optionally (F) a succinimide ashless dispersant in an amount of no more than 0.1 mass % in terms of nitrogen on the basis of the total mass of the composition,*

*the component (F) being a condensation product of an alkyl- or alkenylsuccinic acid or anhydride thereof and a polyamine, and/or a derivative thereof, the alkyl- or alkenylsuccinic acid having a C40-400 alkyl or alkenyl group.*

*15. The lubricating oil composition according to claim 12, wherein the component (A) is a poly(meth)acrylate having a weight average molecular weight of 10,000 to 50,000.*

*16. The lubricating oil composition according to claim 12, wherein the composition comprises 3 to 10 mass % of the component (A) on the basis of the total mass of the composition.*

*17. The lubricating oil composition according to claim 12, wherein the composition comprises 5 to 10 mass % of the component (A) on the basis of the total mass of the composition.*

*18. The lubricating oil composition according to claim 12, wherein the component (A) is a non-dispersant poly(meth) acrylate.*

*19. The lubricating oil composition according to claim 12, wherein the composition is used to lubricate an electric motor or to lubricate the electric motor and a transmission, in an automobile comprising the electric motor.*

*20. A method for lubricating an electric motor of an automobile, the automobile comprising the electric motor, the method comprising:*

*lubricating the electric motor of the automobile, by means of the lubricating oil composition as in claim 12.*

*21. A method for lubricating an electric motor and a transmission of an automobile, the automobile comprising the electric motor and the transmission, the method comprising:*

*lubricating the electric motor and the transmission of the automobile, by means of the lubricating oil composition as in claim 12.*

* * * * *